United States Patent
Venkateswaran et al.

(10) Patent No.: US 11,469,906 B2
(45) Date of Patent: Oct. 11, 2022

(54) SYSTEMS AND METHODS FOR IMPLEMENTING DATA SECURITY

(71) Applicant: Motional AD LLC, Boston, MA (US)

(72) Inventors: Rajesh K. Venkateswaran, Sewickley, PA (US); Anurag Sanu, Pittsburgh, PA (US); Junsung Kim, Pittsburgh, PA (US); Dana Miller, Pittsburgh, PA (US); Brett Sandler, Pittsburgh, PA (US); Silvio Maeta, Pittsburgh, PA (US); James Esper, Pittsburgh, PA (US); Vasudeva Pai Melgangolli, Pittsburgh, PA (US); Yunpeng Xu, Pittsburgh, PA (US); Michael Maass, Pittsburgh, PA (US); Parth Shah, Pittsburgh, PA (US); Scott Sweeny, Pittsburgh, PA (US)

(73) Assignee: MOTIONAL AD LLC, Boston, MA (US)

( * ) Notice: Subject to any disclaimer, the term of this patent is extended or adjusted under 35 U.S.C. 154(b) by 525 days.

(21) Appl. No.: 16/668,459

(22) Filed: Oct. 30, 2019

(65) Prior Publication Data
US 2020/0159930 A1 May 21, 2020

Related U.S. Application Data

(60) Provisional application No. 62/769,749, filed on Nov. 20, 2018.

(51) Int. Cl.
*H04L 29/06* (2006.01)
*H04L 9/32* (2006.01)
(Continued)

(52) U.S. Cl.
CPC .......... *H04L 9/3247* (2013.01); *G06F 21/575* (2013.01); *G06N 20/00* (2019.01);
(Continued)

(58) Field of Classification Search
CPC ..... G06F 21/575; G06F 21/606; G06N 20/00; G06N 5/04; G06N 5/046; G06N 7/005;
(Continued)

(56) References Cited

U.S. PATENT DOCUMENTS 9,445,270 B1 * 9/2016 Bicket ................... H04W 4/80
9,645,577 B1 * 5/2017 Frazzoli ............... B60W 30/09
(Continued)

FOREIGN PATENT DOCUMENTS

CN        100462943 C  * 2/2009
CN        102833260 A  * 12/2012
(Continued)

OTHER PUBLICATIONS

[No Author Listed], SAE "J3016: Taxonomy and Definitions for Terms Related to Driving Automation Systems for On-Road Motor Vehicles," Sep. 30, 2016, 30 pages.

*Primary Examiner* — Sher A Khan
(74) *Attorney, Agent, or Firm* — Fish & Richardson P.C.

(57) ABSTRACT

Among other things, we describe systems and method for implementing data security in an autonomous vehicle system. The systems and methods can include inter-process communication security via key management, in which asymmetric cryptography and other validation techniques are used to validate data received from sensors. The systems and method can also include penetrative testing, in which valid sensor inputs are modified and transmitted throughout a distributed network through one or more sensors.

20 Claims, 15 Drawing Sheets

(51) Int. Cl.
  *G06F 21/57*       (2013.01)
  *H04L 9/08*        (2006.01)
  *H04L 9/30*        (2006.01)
  *G06N 20/00*       (2019.01)
  *H04W 4/46*            (2018.01)
  *G06N 5/04*            (2006.01)
  *H04W 4/44*            (2018.01)

(52) U.S. Cl.
  CPC .......... *H04L 9/0819* (2013.01); *H04L 9/0877* (2013.01); *H04L 9/0891* (2013.01); *H04L 9/30* (2013.01); *H04L 9/3242* (2013.01); *G06N 5/04* (2013.01); *H04L 2209/16* (2013.01); *H04L 2209/42* (2013.01); *H04W 4/44* (2018.02); *H04W 4/46* (2018.02)

(58) Field of Classification Search
  CPC ... H04L 9/0819; H04L 9/0877; H04L 9/0891; H04L 9/30; H04L 9/3242; H04L 9/3247; H04L 2209/16; H04L 2209/42; H04L 9/0825; H04L 9/0897; H04W 4/44; H04W 4/46; H04W 4/38; H04W 4/40
  See application file for complete search history.

(56) References Cited

U.S. PATENT DOCUMENTS

| | | | |
|---|---|---|---|
| 2002/0140289 A1* | 10/2002 | McConnell | B60R 11/02 307/10.1 |
| 2015/0012737 A1* | 1/2015 | Newell | G06F 21/44 713/2 |
| 2018/0006829 A1* | 1/2018 | Kravitz | H04W 12/06 |
| 2018/0145834 A1* | 5/2018 | Dharankar | H04W 12/10 |
| 2019/0007757 A1* | 1/2019 | Reitsma | H04Q 9/00 |

FOREIGN PATENT DOCUMENTS

| | | | | |
|---|---|---|---|---|
| CN | 102986193 A | * | 3/2013 | ......... H04L 63/0492 |
| CN | 103053127 A | * | 4/2013 | ............. H04L 1/24 |

* cited by examiner

SYSTEMS AND METHODS FOR IMPLEMENTING DATA SECURITY

CROSS-REFERENCE TO RELATED APPLICATION

This application claims the benefit of U.S. Provisional Application 62/769,749, filed on Nov. 20, 2018, which is incorporated herein by reference in its entirety.

TECHNICAL FIELD

This disclosure generally relates to data security. In particular, this description relates to systems and methods for implementing data security in vehicles.

BACKGROUND

Some vehicles have autonomous navigation abilities. For example, drones and self-driving cars can be configured to autonomously navigate throughout an environment. These vehicles may collect data from a wide variety of sensors, such as light detection and ranging sensors, radar sensors, and vision-based sensors to assist them in navigating throughout an environment. Furthermore, this data may be shared across a distributed network that includes vehicle-to-vehicle communication links, vehicle-to-infrastructure communication links, vehicle-to-database communication links, and so forth.

SUMMARY

In at least one aspect of the present disclosure, a method for implementing data security is described. The method includes, for each of one or more sensors, digitally signing, using a private key, a portion of data associated with a respective sensor of the one or more sensors such that the portion of data is associated with a digital signature. The method includes validating, by at least one processor, the digital signatures of the respective portion of data upon booting of each sensor. The method includes generating, by the at least one processor, at least one session key. The method includes encrypting, by the at least one processor, the at least one session key. The method includes sending, by the at least one processor, the at least one encrypted session key to the one or more sensors after booting of the one or more sensors, wherein each of the booted one or more sensors receives the at least one session key and decrypts at least one session key using the at least one processor. The method includes sending, by the one or more sensors, sensor data to the at least one processor, the sensor data including a message authentication code generated using the at least one session key. The method includes validating, by the at least one processor, the sensor data at least partially based on the message authentication code and a determining that the sensor data was received within a pre-determined period of time, wherein the at least one processor parses the validated sensor data.

Digitally signing can include storing at least one public key in the at least one processor, the at least one public key being associated with one of the one or more sensors. The sensor data can include identification data associated with the one or more sensors. The method can further include anonymizing the identification data before sending the sensor data to the at least one processor. Anonymizing the identification data can include removing the identification data. Anonymizing the identification data can include obfuscating the identification data. Obfuscating the identification data can include at least one of: substituting the identification data values with secondary identification data values, encrypting the identification data, and shuffling the identification data. Obfuscating the identification data can include learning, by a machine learning coprocessor, secondary identification features associated with the identification data.

Validating the sensor data can include determining whether the sensor data is configured in either an expected format, an expected size, or both. The sensor data can include movement of simulated objected.

The message authentication code can be a hash-based message authentication code. The at least one processor can include a controller circuit that generates the at least one session key. The at least one processor can include a non-migratable key configured for decrypting the encrypted session key. Generating the at least one session key can include generating at least one new session key each time the one or more sensors are booted. Generating the at least one session key can include generating at least one new session key after each new message is received from the one or more sensors. Parsing the data can include organizing the sensor data in accordance with at least one parsing rule. The portion of data can include computer executable code.

In another aspect of the present disclosure, a system for implementing data security is described. The system includes one or more sensors. A portion of data associated with the one or more sensors has been digitally signed with a private key such that the portion of data is associated with a digital signature. The system includes at least one processor. The at least one processors is configured to be communicatively coupled with the one or more sensors, and further configured to validate the digital signatures of the respective portion of data upon booting of each sensor of the one or more sensors. The at least one processors is configured to generate and encrypt at least one session key. The at least one processors is configured to send the at least one session key to the one or more sensors after the one or more sensors have been booted. The at least one processors is configured to decrypt the at least one session key. The at least one processor is configured to receive sensor data from the one or more sensors, the sensor data comprising a message authentication code generated using the at least one session key. The at least one processor is configured to validate the sensor data at least partially based on the message authentication code and a determining that the sensor data was received within a pre-determined period of time. The at least one processor is configured to parse the validated sensor data.

The at least one sensor can include at least one public key. The at least one public key can be associated with one of the one or more sensors. The sensor data can further include identification data associated with the one or more sensors. The at least one processor can include a machine learning coprocessor configured to be communicatively coupled with the one or more sensors and further configured to learn secondary identification features of the one or more sensors. The at least one processor can be further configured to validate the sensor data by determining whether the sensor data is configured in either an expected format, an expected size, or both.

In another aspect of the present disclosure, a method for implementing data security is described. The method includes generating an at least partially invalid input, the at least partially invalid input corresponding to at least one processor. The method includes generating, by the at least one processor, a response based on the at least partially invalid input. The method includes transmitting, by the at least one processor, the response across a distributed network. The method includes analyzing the response output at one or more locations of the distributed network. The method includes determining if one or more vulnerabilities exist within the distributed network, based on the analyzing of the response output.

The distributed network can include a vehicle-to-vehicle communication link. The distributed network can include a vehicle-to-infrastructure communication link. The distributed network can include a vehicle-to-database communication link. The distributed network can include at least one of: a distributed computing database and a cloud computing database. The distributed network can include one or more terminal access points and the analyzing of the response can occur at the one or more terminal access points.

Generating an at least partially invalid input can include generating a sanitizer configured to crash the at least one processor if a specific vulnerability associated with the sanitizer exists within the at least one processor.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

Figure 1:
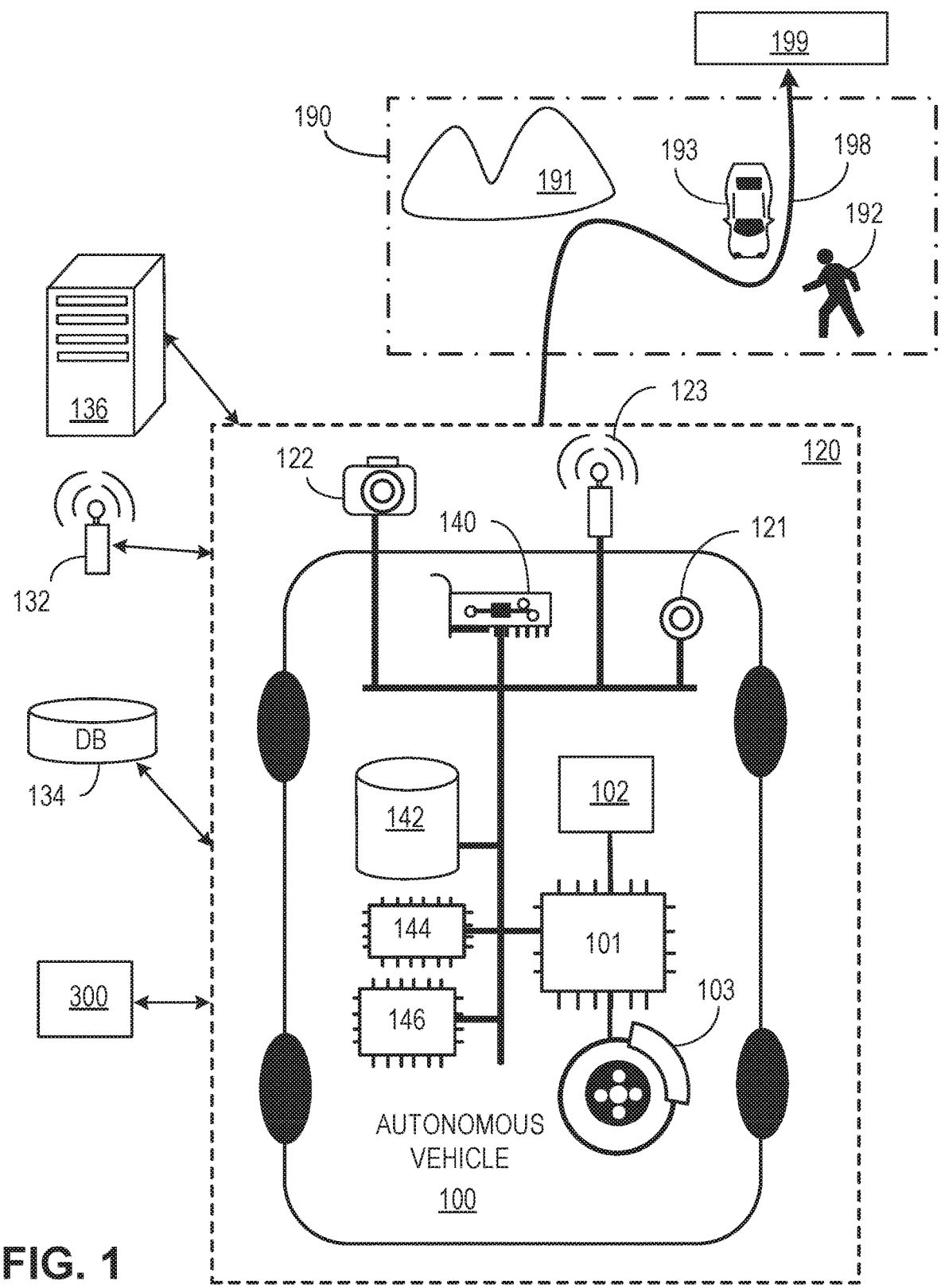
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control
7. Inter-Process Communication Security via Key Management
8. Penetrative Testing on a Distributed System General Overview Vehicles may collect data from a wide variety of sensors, such as light detection and ranging sensors, radar sensors, and vision based sensors, to assist them in navigating throughout an environment. Furthermore, this data may be shared across a distributed network that includes vehicle-to-vehicle communication links, vehicle-to-infrastructure communication links, vehicle-to-database communication links, and so forth.

Each sensor of an autonomous vehicle system represents a vulnerability that may be exploited by outside threats, such as hackers. For example, outside hackers can mirror one or more of the sensors, and thus gain control of the autonomous vehicle. Outside hackers can also find ways to send invalid data through the sensors' firmware, exploiting vulnerabilities in the autonomous vehicle system and causing system failures (e.g., crashes). These actions can have dire consequences on the environment in which the autonomous vehicle is operation, causing potential serious injury to humans or damage to infrastructure. Thus, means for implementing data security in an autonomous vehicle system can be desirable.

Among other things, we describe systems and method for implementing data security in an autonomous vehicle system. The systems and methods can include inter-process communication security via key management. Inter-process communication security via key management can include digitally signing each sensor of an autonomous vehicle and verifying the digital signature of each sensor prior to fully booting the sensors. Inter-process communication security via key management can also include implementing various validation techniques, such as asymmetric cryptography, to validate data received from sensors. The systems and methods for implementing data security in an autonomous vehicle system can also include penetrative testing, in which valid sensor inputs are modified and transmitted throughout a distributed network through one or more sensors of the autonomous vehicle. Penetrative testing can provide means for discovering potential vulnerabilities within the distributed network that may be exploited by outside threats (e.g., hackers) to cause, among other things, system crashes.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including, without limitation, fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle, and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including,"

"comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any level, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates, or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
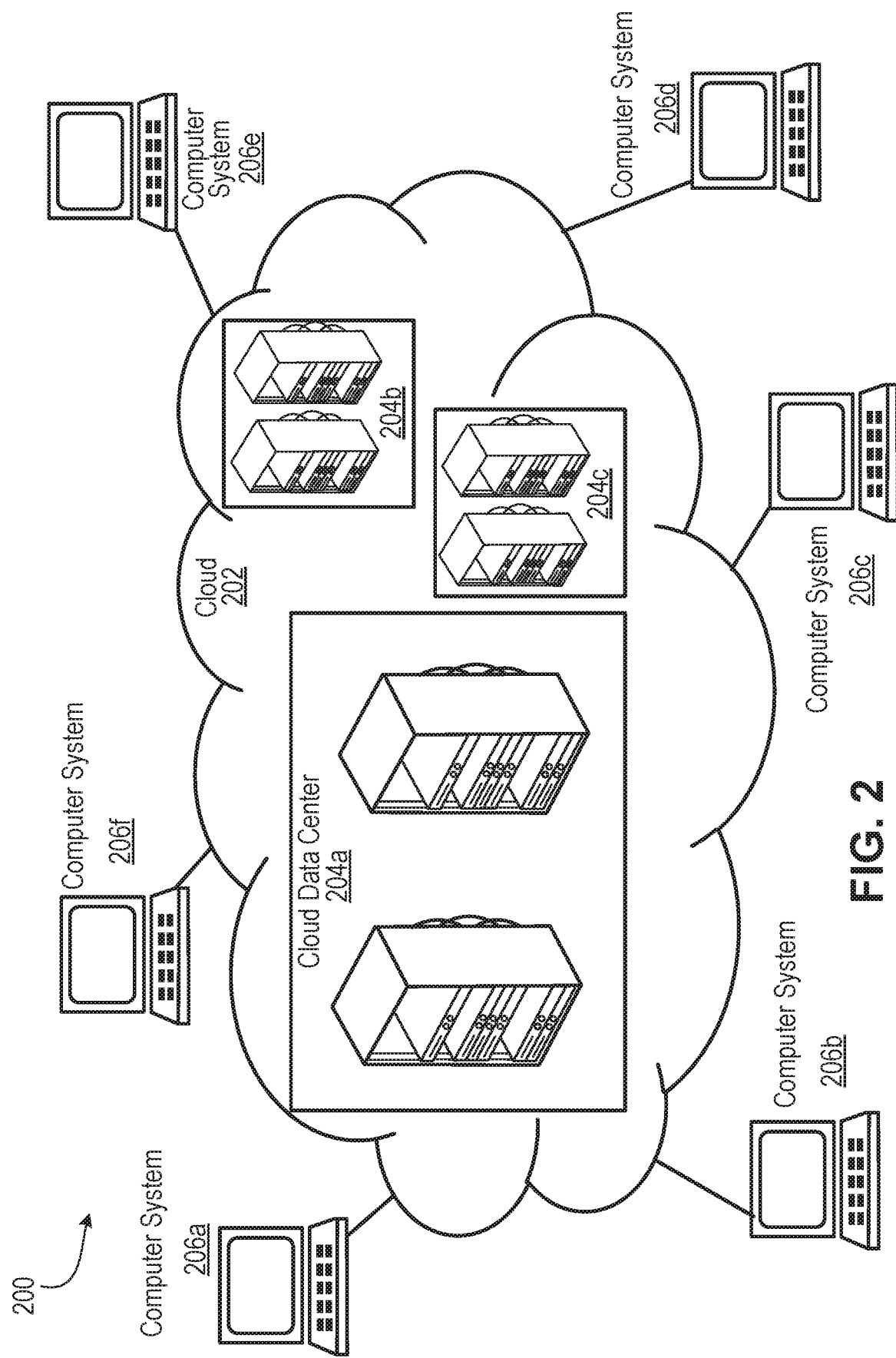
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.), and consumer electronics. In an embodiment, the computing systems 206a-f are implemented in or as a part of other systems.

Figure 3:
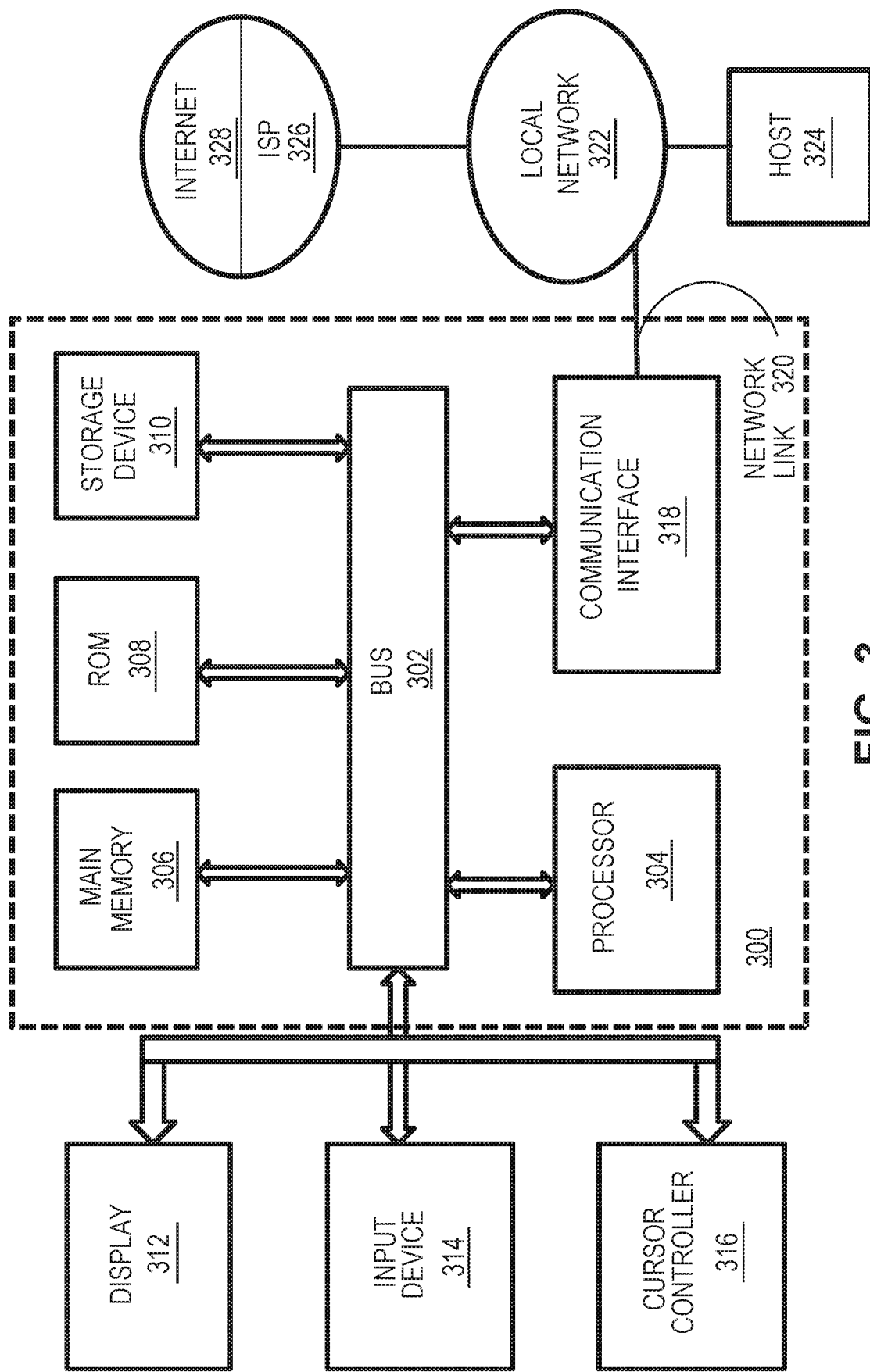
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices, or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, an EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
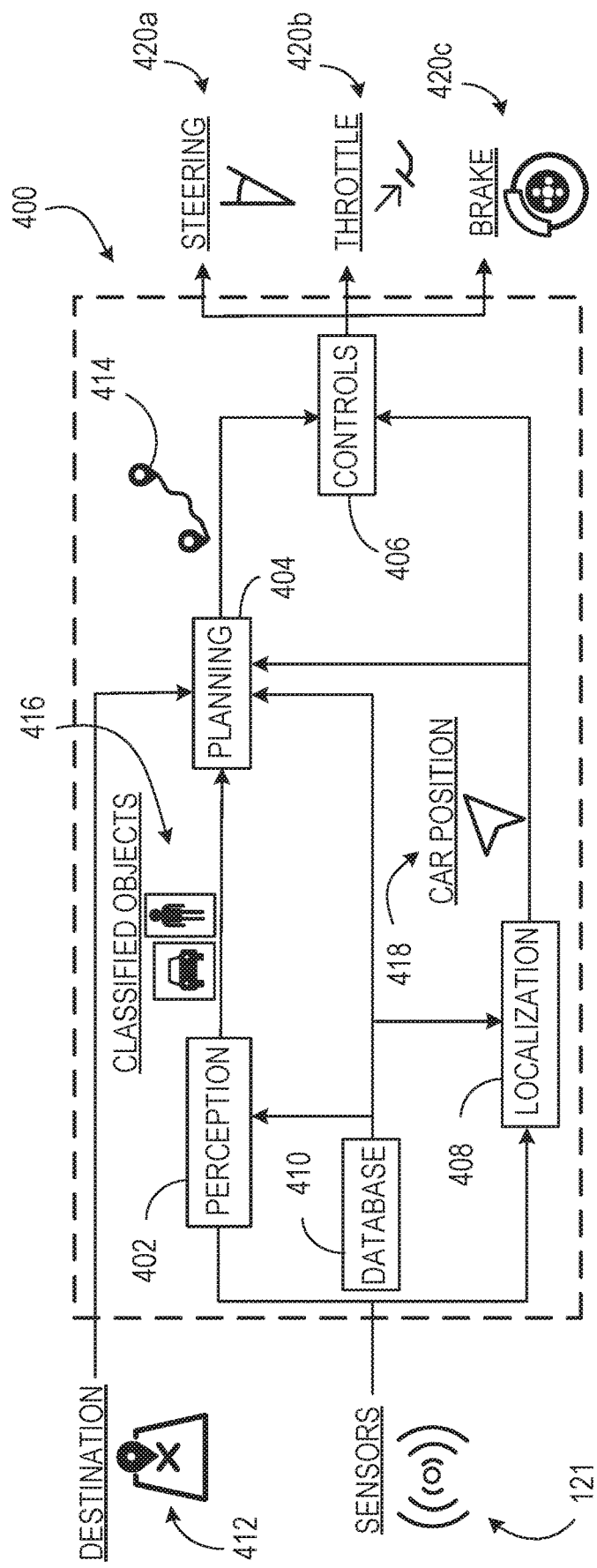
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs, or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
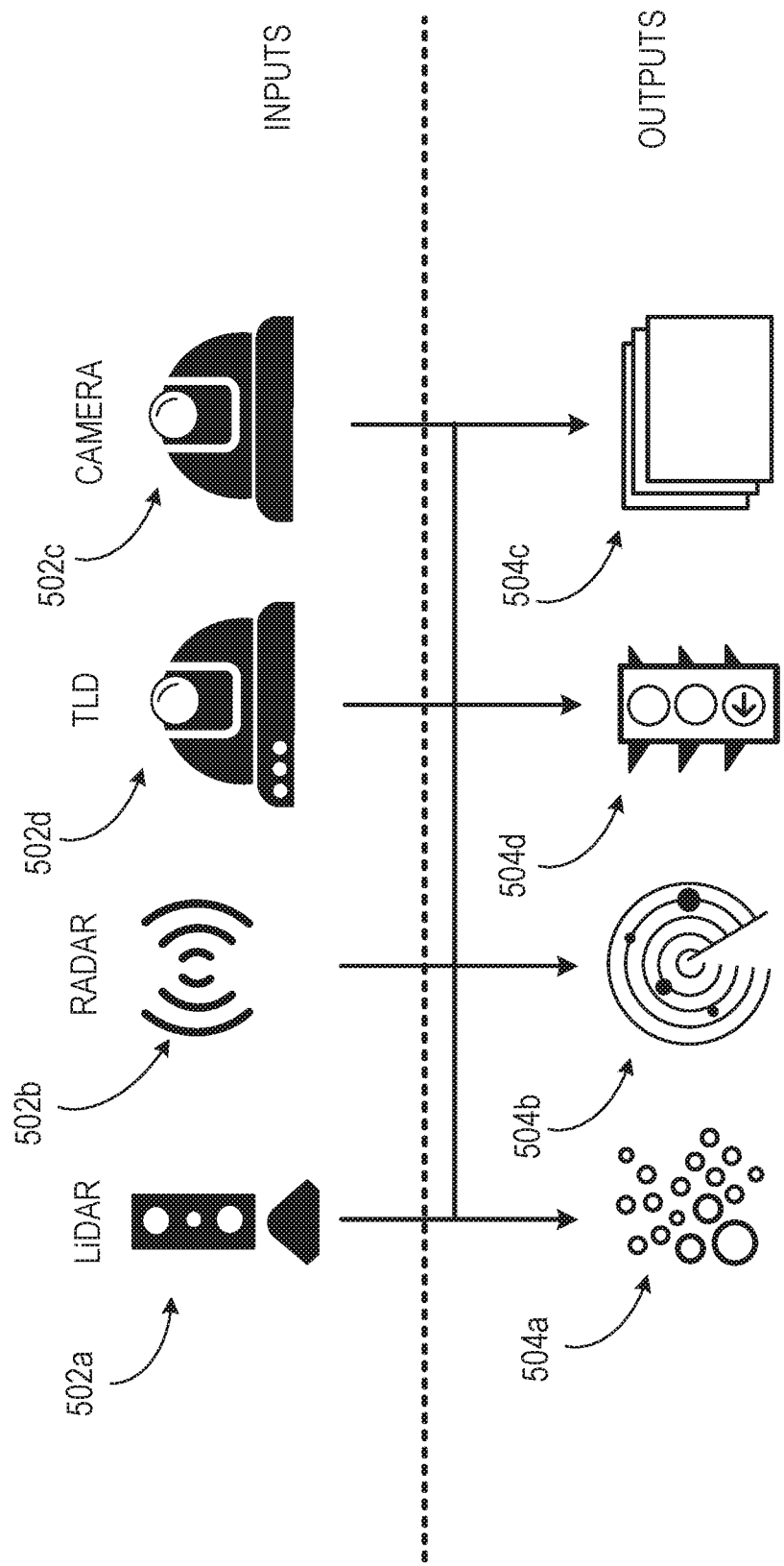
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
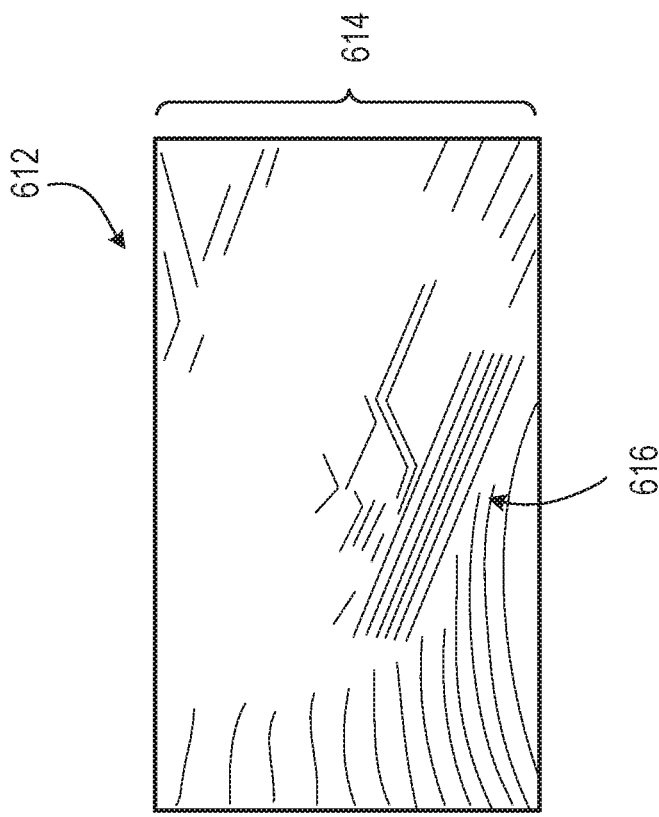
FIG. 6 shows an example of a LiDAR system.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum, for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
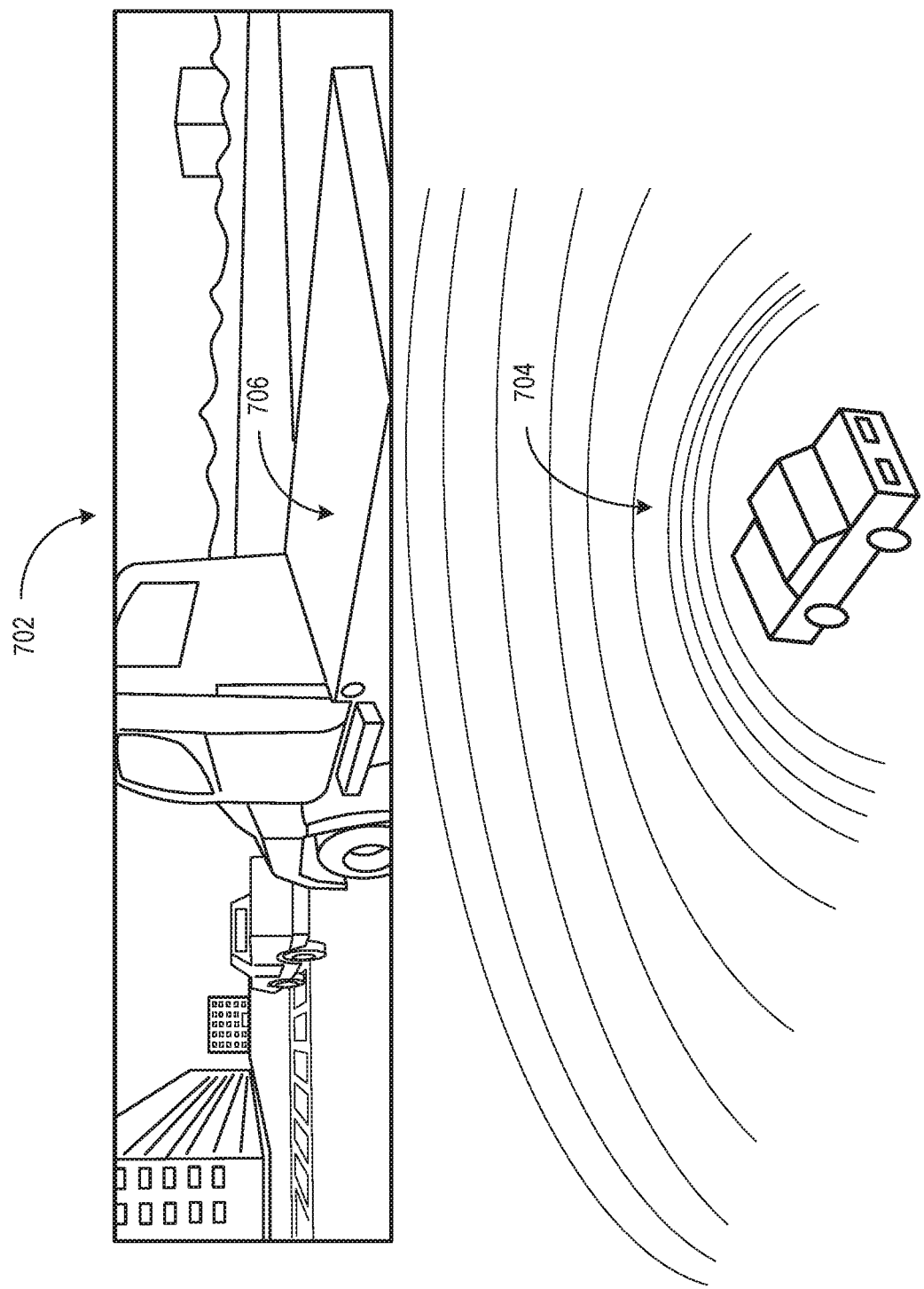
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
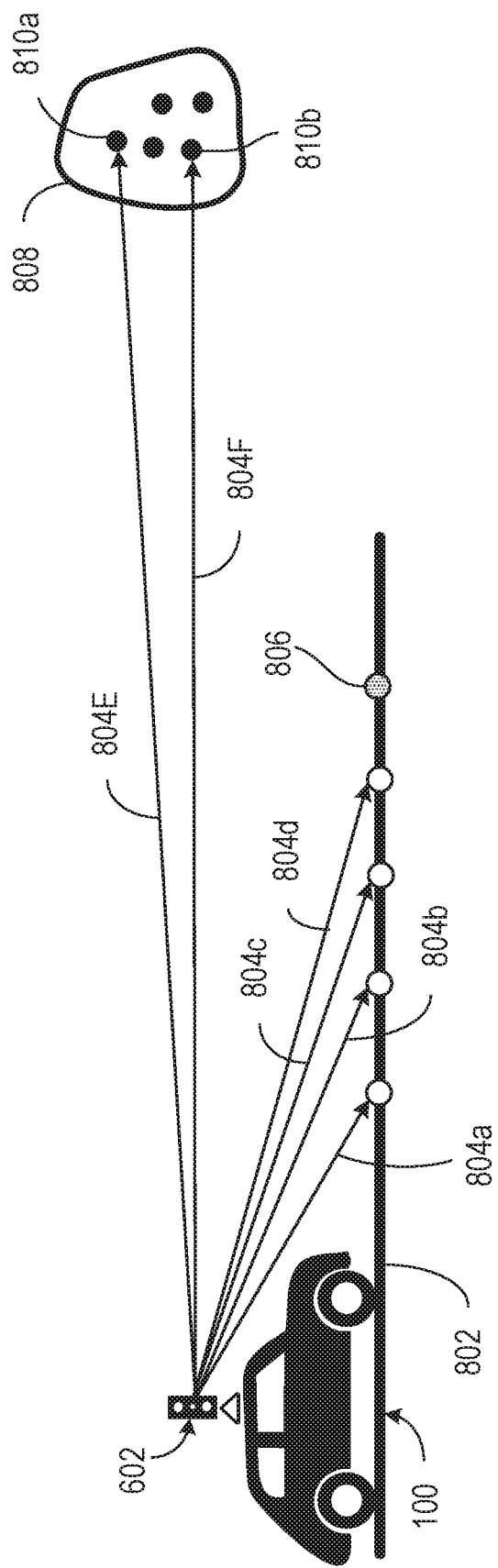
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
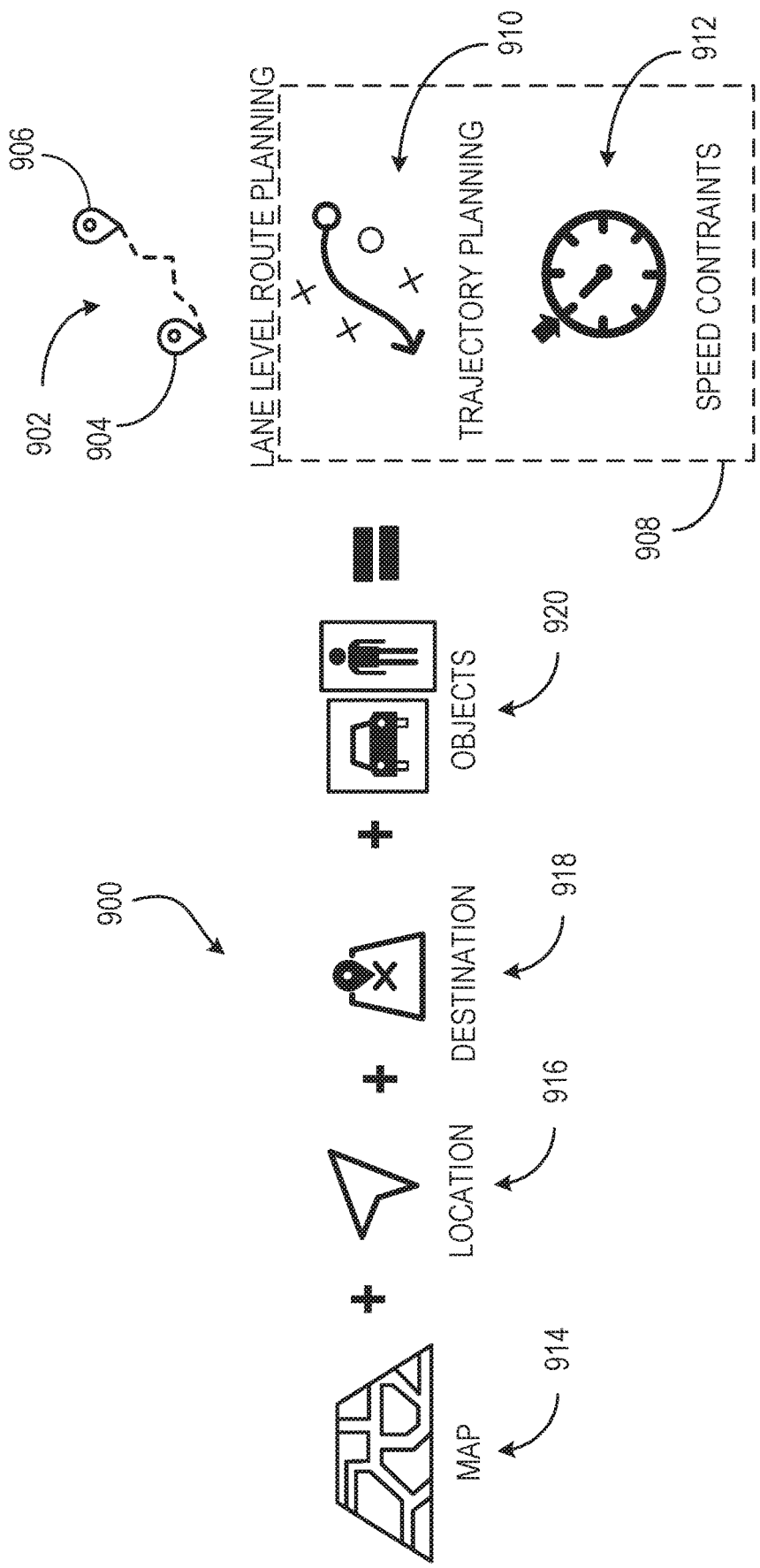
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
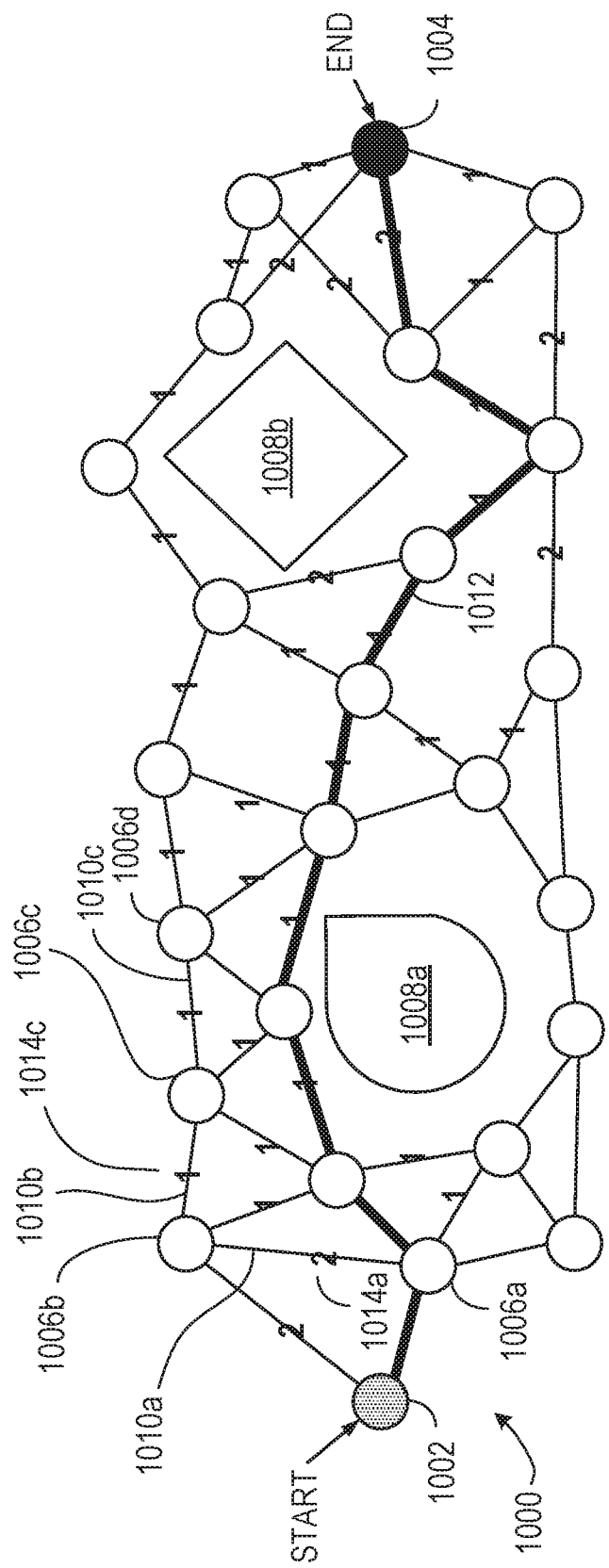
FIG. 10 shows a directed graph used in path planning.
Figure 11:
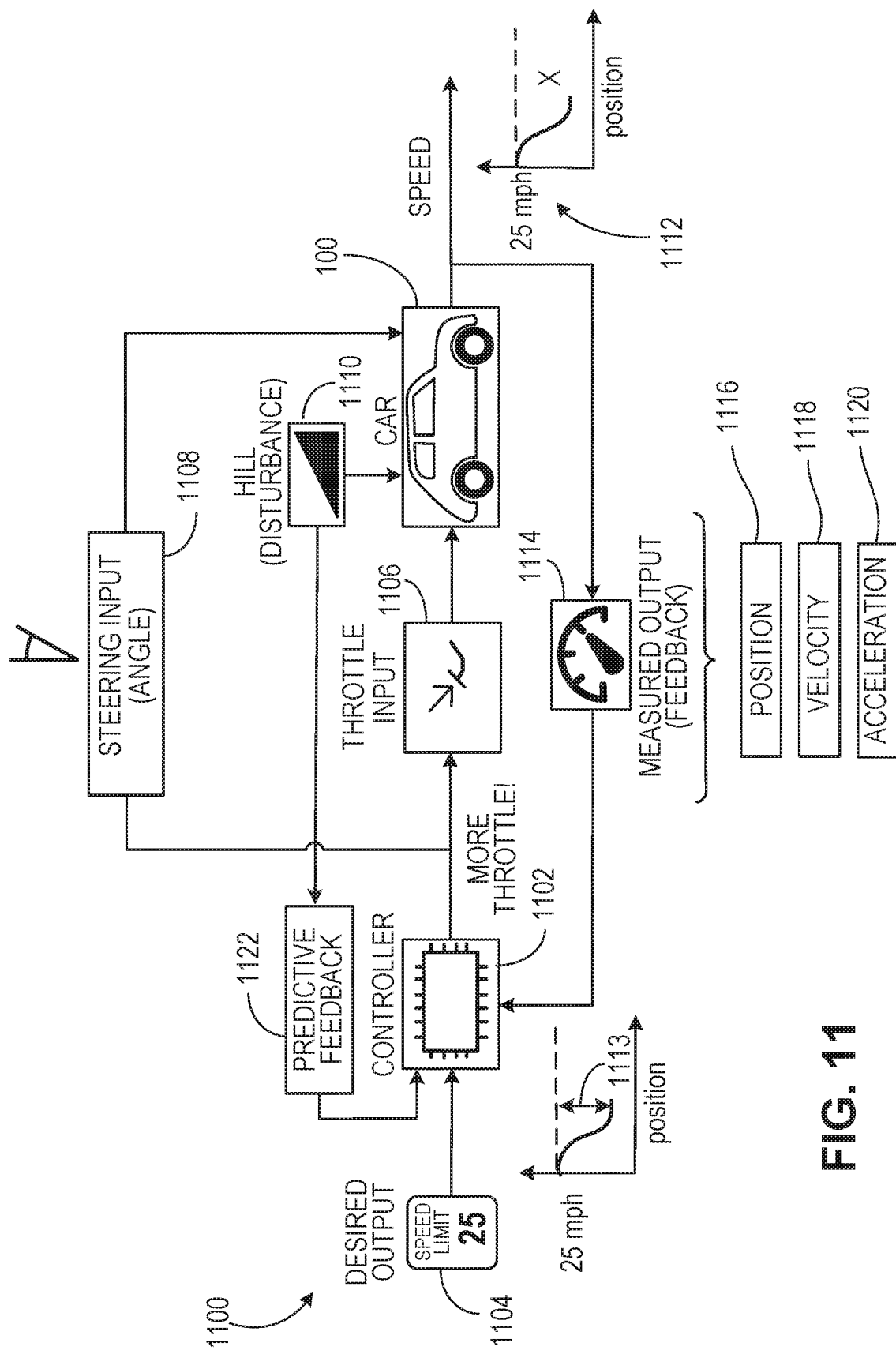
FIG. 11 shows a block diagram of the inputs and outputs of a control module.
Figure 12:
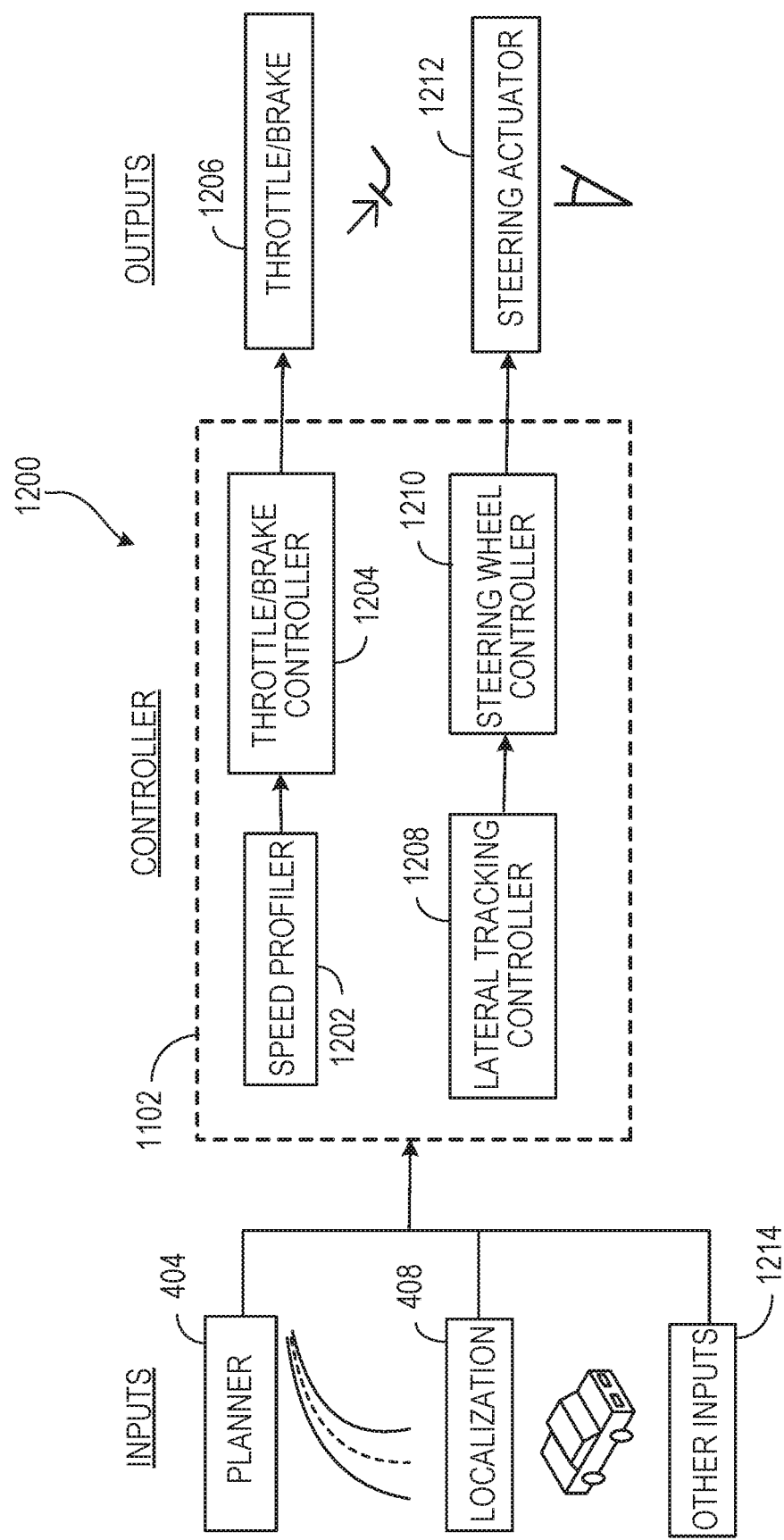
FIG. 12 shows a block diagram of the inputs, outputs, and components of a controller.

FIG. 10 shows a directed graph 1000 used in path planning, e.g., by the planning module 404 (FIG. 4). In general, a directed graph 1000 like the one shown in FIG. 10 is used to determine a path between any start points 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010*a-b* may represent the same physical distance, but one edge 1010*a* may require more fuel than another edge 1010*b*, e.g., because of road conditions, expected weather, etc. When the planning module 404 identifies a path 1012 between the start point 1002 and end point 1004, the planning module 404 typically chooses a path optimized for cost, e.g., the path that has the least total cost when the individual costs of the edges are added together.

Inter-Process Communication Security via Key Management

Figure 13:
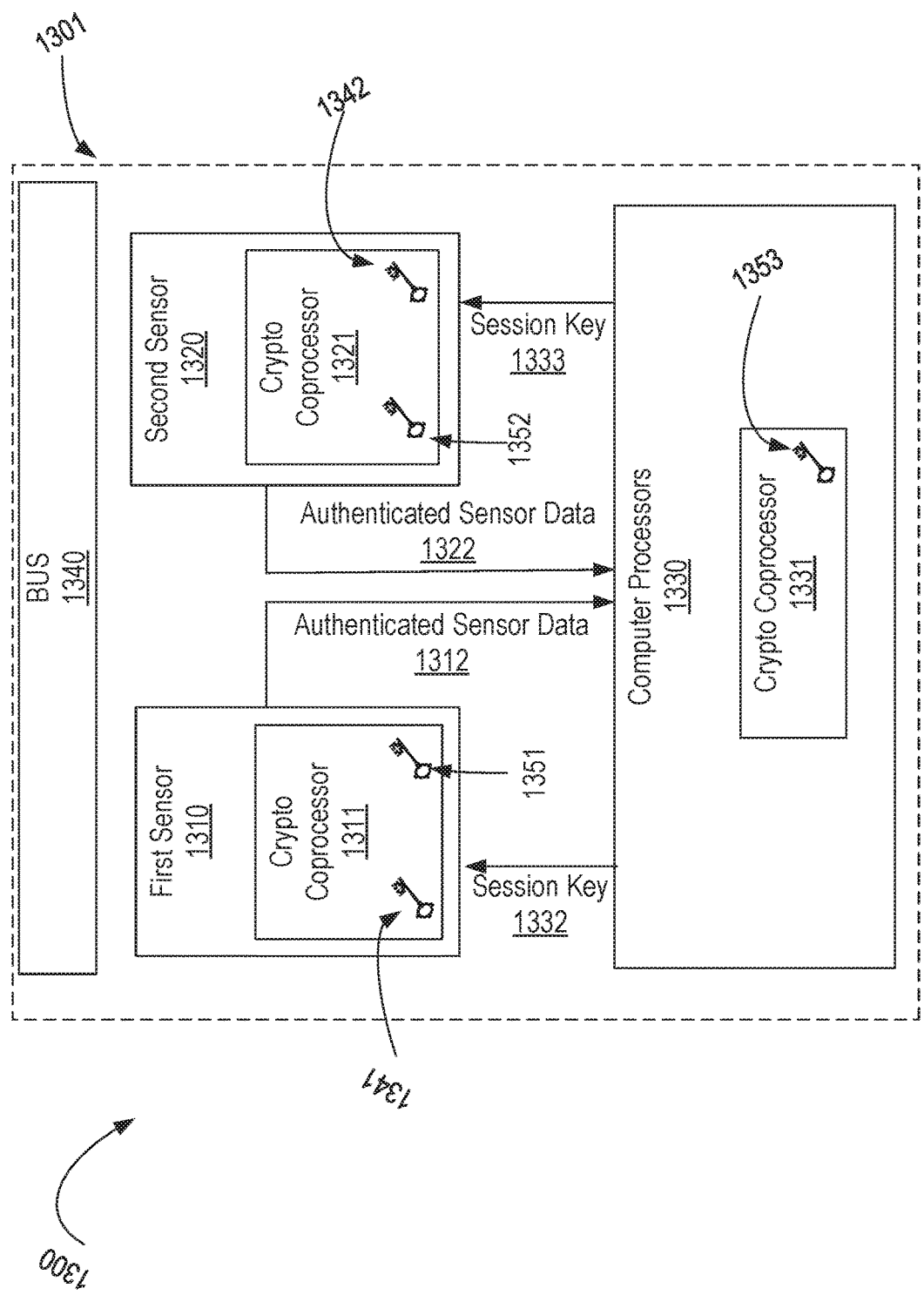
FIG. 13 is an illustration showing an architecture for providing inter-process communication security via key management, in accordance with one or more embodiments of the present disclosure.

FIG. 13 is an illustration showing an architecture 1300 for providing inter-process communication security via key management, in accordance with one or more embodiments of the present disclosure. Inter-process communication security via key management can allow for the prevention of malicious tampering and/or spoofing by, for example, digitally signing sensor data and implementing one or more validation techniques during communication sessions. The architecture 1300 includes a multi-sensor communication system 1301. The multi-sensor communication system 1301 includes a first sensor 1310, a second sensor 1320, and computer processors 1330. The first sensor 1310 includes a first cryptographic coprocessor 1311. The second sensor 1320 includes a second cryptographic coprocessor 1321. The computer processor 1330 include a third cryptographic coprocessor 1331. These components are connected via a bus 1340.

Each of the sensors 1310, 1320 can be one of several types of sensing devices. For example, in an embodiment, each of the sensors 1310, 1320 is one of the sensors 121 discussed previously with reference to FIG. 1. In an embodiment, each of the sensors 1310, 1320 is one or more of the inputs 502*a-c* as discussed previously with reference to FIG. 5. In the shown embodiment, the first sensor 1310 is a LiDAR and the second sensor 1320 is a camera. The camera can be a monocular or stereo video camera configured to capture light in the visible, infrared, and/or thermal spectra. In an embodiment, at least one of the sensors 1310, 1320 is an ultrasonic sensor. In an embodiment, the first sensor 1310 is a radar. At least one of the sensors 1310, 1320 can also include a combination of sensing devices. For example, in an embodiment, at least one of the sensors 1310, 1320 includes a camera and a radar. In an embodiment, at least one of the sensors 1310, 1320 also includes additional sensors for sensing or measuring properties of an AV's (e.g., AV100) environment. For example, monocular or stereo video cameras 122 in the visible light, infrared or thermal (or both) spectra, LiDAR 123, radar, ultrasonic sensors, time-of-flight (TOF) depth sensors, speed sensors, temperature sensors, humidity sensors, and precipitation sensors. Although the illustrated embodiment includes a first sensor 1310 and a second sensor 1320, the system 1301 can included one or more additional sensors. For example, in an embodiment, the system 1301 includes a third sensor. In an embodiment, the system 1301 includes a third, fourth, and fifth sensor.

In an embodiment, the first and second sensors 1310, 1320 include computer-readable memory. The computer-readable memory can include any data storage technology type which is suitable to the local technical environment, including but not limited to semiconductor based memory devices, magnetic memory devices and systems, optical memory devices and systems, fixed memory, removable memory, disc memory, flash memory, dynamic random-access memory (DRAM), static random-access memory (SRAM), electronically erasable programmable read-only memory (EEPROM) and the like. In an embodiment, the computer-readable memory stores the sensors' 1310, 1320 firmware.

At least a portion of each of the sensors' 1310, 1320 firmware has been digitally signed using an encryption technique, e.g., an encryption algorithm such as an asymmetric cryptographic algorithm (e.g., Diffie-Hellman, Rivet-Shammir-Aldeman, Elliptic Curve, etc.). In an embodiment, both sensors' 1310, 1320 firmware are digitally signed using the same encryption algorithm. In an embodiment, the sensors' 1310, 1320 firmware are digitally signed using different encryption algorithms. In an embodiment, the digital signatures used for signing both sensors' 1310, 1320 firmware uses asymmetric cryptography (e.g., using a combination of public and private encryption keys that are mathematically linked). In an embodiment, each of the sensors' 1310, 1320 firmware is signed with a private key.

The cryptographic processors 1311, 1321, 1331 are processors optimized for cryptographic algorithms. The first cryptographic coprocessor 1311 is configured to store a public key 1341 associated with the private key used to sign the first sensor's 1310 firmware. The second cryptographic coprocessor 1321 is configured to store a public key 1342 associated with the private key used to sign the second sensor's 1320 firmware. In an embodiment, the first cryptographic coprocessor 1311 is configured to store a non-migratable private key 1351 configured for decryption operations. As explained later, the non-migratable private key 1351 can be used to decrypt session keys during a communication session. As used hereinafter, the term non-migratable refers to keys that stay within a trusted platform module (TPM) chip (as opposed to being shared between TPM devices). In an embodiment, the second cryptographic coprocessor 1321 is configured to store a non-migratable private key 1352 configured for decryption operations. In an embodiment, the third cryptographic coprocessor 1331 is configured to store a non-migratable private key 1353 configured for decryption operations. In an embodiment, all cryptographic coprocessors 1311, 1321, 1331 store the same non-migratable private key. In an embodiment, all cryptographic coprocessors 1311, 1321, 1331, share the same non-migratable private key if all the cryptographic coprocessors are implemented as a part of the same secure operating environment.

When the first sensor 1310 is booted (e.g., powered-on), the first cryptographic coprocessor 1311 is configured to validate the digital signature of the first sensor's 1310 firmware with the stored public key 1341 associated with the private key used to sign the first sensor's firmware by, for example, verifying that a message being sent was from a holder of the paired private key. If the first sensor's 1310 firmware is not validated by the first cryptographic coprocessor 1311, the first sensor 1310 is not fully booted and/or is depowered (e.g., the cryptographic coprocessor 1311 does not allow the first sensor 1310 to power-on). In an embodiment, AV 100 sends an alert to remote server 136 if the first sensor's 1310 firmware is not validated. When the second sensor 1320 is booted (e.g., powered-on), the second cryptographic coprocessor 1321 is configured to validate the digital signatures of the second sensor's 1320 firmware with the stored public key 1342 associated with the private key used to sign the second sensor's firmware by, for example, verifying that a message being sent was from a holder of the paired private key. If the second sensor's 1320 firmware is not validated by the second cryptographic coprocessors 1321, the second sensor 1320 is not fully booted and/or is depowered. In an embodiment, AV 100 sends an alert to remote server 136 if the second sensor's 1320 firmware is not validated. Thus, when the first and second sensors 1310, 1320 are booted, their associated cryptographic coprocessors 1311, 1321 can carry out operations to ensure that the firmware of the sensors 1310, 1320 have not been altered (e.g., by hackers, viruses, etc.), and the sensors 1310, 1320 can be disabled if their firmware has been modified.

The third cryptographic coprocessor 1331 is configured to generate a first session key 1332 and send the first session key 1332 to the first sensor 1310. In an embodiment, the first session key 1332 is an encryption and decryption key that is randomly generated to ensure the security of communications between the first sensor 1310 and the computer processors 1330 during a communication session. In an embodiment, the first session key 1332 is derived from a hash value using a session-key derivation scheme. The third cryptographic coprocessor 1331 is configured to generate a second session key 1333 and send the second session key 1333 to the second sensor 1320. In an embodiment, the second session key 1333 is an encryption and decryption key that is randomly generated to ensure the security of communications between the second sensor 1320 and the computer processors 1330 during a communication session. In an embodiment, the second session key 1333 is derived from a hash value using a session-key derivation scheme. In an embodiment, the first session key 1332 and the second session key 1333 are the same session keys.

In an embodiment, the third cryptographic coprocessor 1331 generates the first session key 1332 and/or the second session key 1333 every time the first sensor 1310 and/or the second sensor 1320 is booted. In an embodiment, the third cryptographic coprocessor 1331 generates the first session key 1332 and/or the second session key 1333 after each time the first sensor 1310 and/or the second sensor 1320 communicates (e.g., transmits sensor data) to the computer processors 1330. In an embodiment, the third cryptographic coprocessors 1331 generates the first session key 1332 and/or second session key 1333 after a specified time period elapses (e.g., every thirty seconds, every one minute, every five minutes, etc.). In an embodiment, each of the session keys 1310, 1320 are paired with the private non-migratable keys 1351, 1352 stored in the first and second cryptographic coprocessors 1311, 1321.

The first cryptographic coprocessor 1311 is configured to receive the first session key 1332 and decrypt the first session key 1332. In an embodiment, first cryptographic coprocessor 1311 uses the stored private non-migratable key 1351 to decrypt the first session key 1332. The second cryptographic coprocessor 1321 is configured to receive the second session key 1333 and decrypt the second session key 1333. In an embodiment, the second cryptographic coprocessors 1321 uses the stored private non-migratable key 1352 to decrypt the second session key 1333.

The first sensor 1311 is configured to transmit authenticated sensor data 1312 to the computer processors 1330. The authenticated sensor data 1312 transmitted from the first sensor 1311 can include detected data (e.g., point cloud data, object detection data, etc.) or simulated detection data (e.g., from a user implemented software-based simulated environment). The simulated detection data can include simulated pedestrian movement, simulated car movement, simulated traffic light detection data, and so forth. The authenticated sensor data 1312 includes a message authentication code (MAC) generated using the decrypted session key. In an embodiment, the MAC confirms that the authenticated sensor data 1312 was sent from the first sensor 1311. In an embodiment, the MAC is a hash-based message authentication code (HMAC). An HMAC refers to a specific message authentication code involving cryptographic hash functions. In an embodiment, a SHA256 cryptographic hash function is used to generate the HMAC. In an embodiment, an SHA-3 cryptographic hash function is used to generate the HMAC.

In use, the HMAC is generated based on the session key and the data being transmitted, e.g., sensor data. The HMAC is generated and attached to the data and then can be used to verify the validity of the data. For example, an entity receiving the data and the HMAC can use the session key and the data to generate the HMAC and confirm that the generated HMAC matches the received HMAC. Similar techniques can be used with other kinds of MACs.

The second sensor 1321 is configured to transmit authenticated sensor data 1322 to the computer processors 1330. The authenticated sensor data 1322 transmitted from the second sensor 1321 can include detection data (e.g., point cloud data, object detection data, pixel intensity data, etc.) or simulated detection data (e.g., from a user implemented software-based simulated environment). The authenticated sensor data 1322 includes a MAC generated by the decrypted session key. In an embodiment, the MAC confirms that the authenticated sensor data 1322 was sent from the second sensor 1321. In an embodiment, the MAC is a HMAC. In an embodiment, a SHA256 cryptographic hash function is used to generate the HMAC. In an embodiment, an SHA-3 cryptographic hash function is used to generate the HMAC.

In an embodiment, the authenticated sensor data 1312, 1313 include identification data associated with the sensors 1310, 1320. For example, in an embodiment, the authenticated sensor data 1312, 1313 includes global positioning system (GPS) data (e.g., location data), waveform data, and/or tag identification data (e.g., each of the sensors 1310, 1320 can be encoded with a specific tag that identifies the sensors 1310, 1320). In an embodiment, before each of the sensors 1310, 1320 transmit the authenticated sensor data 1312, 1322, the cryptographic coprocessors 1311, 1321 anonymize the identification data. For example, in an embodiment, the cryptographic coprocessors 1311, 1321 remove the identification data from the authenticated sensor data 1312, 1322. In an embodiment, the cryptographic coprocessors 1311, 1321 obfuscate the identification data. In an embodiment, obfuscating the identification data includes substituting the values of the identification data with randomly generated secondary values or algorithmically generated secondary values. In an embodiment, obfuscating the identification data includes algorithmically shuffling the values of the identification data. In an embodiment, obfuscating the identification data includes encrypting the identification data.

In an embodiment, the computer processors 1330 include a machine learning coprocessor configured to learn the ways in which the identification data of the authenticated sensor data 1312, 1322 is obfuscated. For example, in an embodiment, the machine learning coprocessors learn how the first and second cryptographic coprocessors 1311, 1321 algorithmically generate secondary values. In an embodiment, the machine learning coprocessors learn how the first and second cryptographic coprocessors 1311, 1321 algorithmically shuffle the values of the identification data. Thus, the computer processors 1330 can have one or more methods to ensure that the authenticated sensor data 1312, 1322 is being sent from the first and second sensors 1310, 1320. The machine learning coprocessor can include Bayesian model techniques and/or deep learning techniques. In an embodiment, the machine learning coprocessors are also configured to learn the identification data associated with each of the sensors 1310, 1320. For example, the machine learning coprocessor can learn to associate waveform data with each of the sensors 1310, 1320, location data of each of the sensors 1310, 1320, and so forth.

In an embodiment, the computer processors 1330 include one or more computer processors (e.g., microprocessors, microcontrollers, or both) similar to the processor 304 discussed earlier with reference to FIG. 3. The computer processors 1330 are configured to receive the authenticated sensor data 1312, 1322 from the first and second sensors 1310, 1320. The third cryptographic coprocessor 1331 is configured to validate the authenticated sensor data 1312, 1322 based on the MAC (or HMAC) associated with the authenticated sensor data 1312, 1322. For example, in an embodiment, the third cryptographic coprocessor 1331 determines an expected MAC (or HMAC) based on the received data and the corresponding session key. If the received MAC does not match the expected MAC, the authenticated sensor data 1312, 1322 is not validated and the computer processors 1330 do not continue processing the authenticated sensor data 1312, 1322.

In an embodiment, the authenticated sensor data 1312, 1322 is time stamped. In an embodiment, the third cryptographic coprocessor 1331 validates the authenticated sensor data 1312, 1322 based on a determining that the authenticated sensor data 1312, 1322 was received within an expected period of time. For example, in an embodiment, the third cryptographic coprocessor 1331 uses an expected time associated with the time it should take for the authenticated sensor data 1312, 1322 to transmit from the sensors 1310, 1320 to the computer processors 1330, and if the transmittal time is not within the expected period of time (e.g., time interval), the authenticated sensor data 1312, 1322 is not validated. In an embodiment, the third cryptographic coprocessor 1331 is configured to validate the authenticated sensor data 1312, 1322 by using an expected format. For example, in an embodiment, if the received authenticated sensor data 1312, 1322 is not configured in an expected format (e.g., ASCII, LAS, CIFF, JPEG, RAW, etc.) the third cryptographic coprocessor 1331 does not validate the authenticated sensor data 1312, 1322. In an embodiment, if the received authenticated sensor data 1312, 1322 is not configured in an expected size (e.g., megabytes, gigabytes, etc.) the third cryptographic coprocessor 1331 does not validate the authenticated sensor data 1312, 1322. Thus, the third cryptographic coprocessors 1331 can use several expected features of the authenticated sensor data 1312, 1322 to ensure that the authenticated sensor data 1312, 1322 is being received from the sensors 1310, 1320, and that the sensor data has not been spoofed, modified, corrupted, or augmented in any way by an external agent. In an embodiment, once the third cryptographic coprocessor 1331 validates the authenticated sensor data 1312, 1322, the computer processors 1330 parse the authenticated sensor data 1312, 1322 for further processing. In an embodiment, the computer processors 1330 parse the authenticated sensor data 1312, 1322 by organizing the sensor data in accordance with at least one parsing rule. For example, as a parsing rule, the computer processors 1330 can organize the sensor data 1312, 1322 in accordance with sensor type, file type, file size, data type, object type, and so forth.

Figure 14:
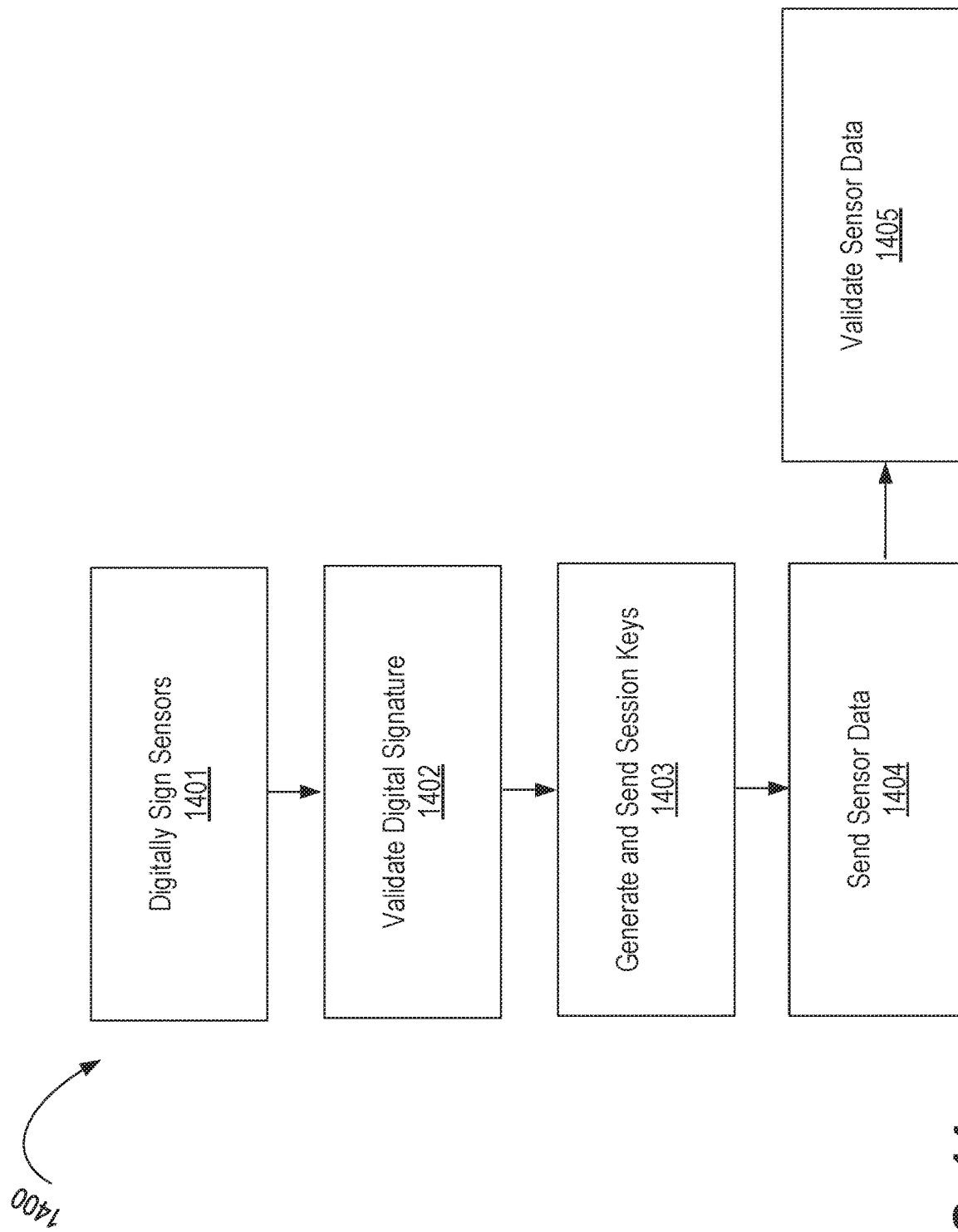
FIG. 14 shows a method for providing inter-process communication security via key management, in accordance with one or more embodiments of the present disclosure.

FIG. 14 shows a method 1400 for providing inter-process communication security via key management, in accordance with one or more embodiments of the present disclosure. For illustrative purposes, the method 1400 is described as being performed by the system 1300 for providing inter-process communication security via key management. The method 1400 includes digitally signing sensors (block 1401), validating digital signatures (block 1402), generating and sending session keys (block 1403), sending sensor data (block 1404), and validating sensor data (block 1405).

At block 1401, each of the sensors' 1310, 1320 firmware is digitally signed using, for example, an encryption technique. The firmware for both sensors 1310, 1320 can be digitally signed by, for example, a vendor and/or manufacturer. In an embodiment, both sensors' 1310, 1320 firmware are digitally signed using the same encryption algorithm. In an embodiment, the sensors' 1310, 1320 firmware are digitally signed using different encryption algorithms. In an embodiment, the digital signatures used for signing both sensors' 1310, 1320 firmware uses asymmetric cryptography (e.g., using a combination of public and private encryption keys that are mathematically linked). In an embodiment, each of the sensors' 1310, 1320 firmware is signed with a private key.

At block 1402, the first cryptographic coprocessor 1311 validates the digital signature of the first sensor's 1310 firmware and the second cryptographic coprocessor 1321 validates the digital signature of the second sensor's 1320 firmware. As previously indicated with reference to FIG. 13, a public key 1341, 1342 is stored in each of the first and second cryptographic coprocessors 1311, 1321. Each public key 1341, 1342 is associated with the private keys used to sign the firmware of the sensors 1310, 1320. The cryptographic coprocessors 1311, 1321 use the public keys 1341, 1342 to validate the digital signatures by, for example, verifying messages are sent by a holder of the paired private key. If the first sensor's 1310 firmware is not validated by the first cryptographic coprocessor 1311, the first sensor 1310 will not be fully booted and/or is depowered. If the second sensor's 1320 firmware is not validated by the second cryptographic coprocessors 1321, the second sensor 1320 is not fully booted and/or is depowered. Thus, when the first and second sensors 1310, 1320 are booted, their associated cryptographic coprocessors 1311, 1321 can carry out operations to ensure that the firmware of the sensors 1310, 1320 have not been altered (e.g., by hackers, viruses, etc.), and the sensors 1310, 1320 are disabled if their firmware has been modified.

At block 1403, the third cryptographic coprocessor 1331 generates a first session key 1332 and sends the first session key 1332 to the first sensor 1310. In an embodiment, the first session key 1332 is an encryption and decryption key that is randomly generated to ensure the security of communications between the first sensor 1310 and the computer processors 1330. In an embodiment, the first session key 1332 is derived from a hash value using a session-key derivation scheme. The third cryptographic coprocessor 1331 also generates a second session key 1333 and sends the second session key 1333 to the second sensor 1320. In an embodiment, the second session key 1333 is an encryption and decryption key that is randomly generated to ensure the security of communications between the second sensor 1320 and the computer processors 1330. In an embodiment, the second session key 1333 is derived from a hash value using a session-key derivation scheme. In an embodiment, the first session key 1332 and the second session key 1333 are the same session keys. In an embodiment, the third cryptographic coprocessor 1331 generates the first session key 1332 and/or the second session key 1333 every time the first sensor 1310 and/or the second sensor 1320 is booted. In an embodiment, the third cryptographic coprocessor 1331 generates the first session key 1332 and/or the second session key 1333 after each time the first sensor 1310 and/or the second sensor 1320 transmits sensor data to the computer processors 1330. In an embodiment, the third cryptographic coprocessors 1331 generates the first session key 1332 and/or second session key 1333 after a specified time period elapses (e.g., every 30 seconds, every one minute, every five minutes, etc.). In an embodiment, each of the session keys 1310, 1320 are paired with the private non-migratable keys 1351, 1352 stored in the first and second cryptographic coprocessors 1311, 1321.

The first cryptographic coprocessor 1311 receives the first session key 1332 and decrypts the first session key 1332. In an embodiment, first cryptographic coprocessor 1311 uses the stored private non-migratable key 1351 to decrypt the first session key 1332. The second cryptographic coprocessors 1321 receives the second session key 1333 and decrypts the second session key 1333. In an embodiment, the second cryptographic coprocessors 1321 uses the stored private non-migratable key 1352 to decrypt the second session key 1333.

At block 1404, The first sensor 1311 transmits the authenticated sensor data 1312 to the computer processors 1330. The authenticated sensor data 1312 transmitted from the first sensor 1311 can include detected data (e.g., point cloud data, object detection data, etc.) or simulated detection data (e.g., from a user implemented software-based simulated environment). The authenticated sensor data 1312 includes a message authentication code (MAC) generated by the decrypted session key 1332. In an embodiment, the MAC confirms that the authenticated sensor data 1312 was sent from the first sensor 1311. In an embodiment, the MAC is a hash-based message authentication code (HMAC). In an embodiment, a SHA256 cryptographic hash function is used to generate the HMAC. In an embodiment, an SHA-3 cryptographic hash function is used to generate the HMAC.

The second sensor 1321 transmits authenticated sensor data 1322 to the computer processors 1330. The authenticated sensor data 1322 transmitted from the second sensor 1321 can include detected data (e.g., point cloud data, object detection data, pixel intensity data, etc.) or simulated detection data (e.g., from a user implemented software-based simulated environment). The authenticated sensor data 1322 includes a message authentication code (MAC) generated by the decrypted session key 1333. In an embodiment, the MAC confirms that the authenticated sensor data 1322 was sent from the second sensor 1321. In an embodiment, the MAC is a hash-based message authentication code (HMAC). In an embodiment, a SHA256 cryptographic hash function is used to generate the HMAC. In an embodiment, an SHA-3 cryptographic hash function is used to generate the HMAC.

In an embodiment, the authenticated sensor data 1312, 1313 includes identification data associated with the sensors 1310, 1320. For example, in an embodiment, the authenticated sensor data 1312, 1313 includes global positioning system (GPS) data (e.g., location data), waveform data, and/or tag identification data (e.g., each of the sensors 1310, 1320 can be encoded with a specific tag that identifies the sensors 1310, 1320). In an embodiment, before each of the sensors 1310, 1320 transmit the authenticated sensor data 1312, 1322, the first and second cryptographic coprocessors 1311, 1321 anonymize the identification data. For example, in an embodiment, the first and second cryptographic coprocessors 1311, 1321 remove the identification data from the authenticated sensor data 1312, 1322. In an embodiment, the first and second cryptographic coprocessors 1311, 1321 obfuscate the identification data. In an embodiment, obfuscating the identification data includes substituting the values of the identification data with randomly generated secondary values or algorithmically generated secondary values. In an embodiment, obfuscating the identification data includes algorithmically shuffling the values of the identification data. In an embodiment, obfuscating the identification data includes encrypting the identification data.

At block 1405, the computer processors 1330 are receive the authenticated sensor data 1312, 1322 from the first and second sensors 1310, 1320. The third cryptographic coprocessor 1331 validates the authenticated sensor data 1312, 1322 based on the MAC (or HMAC) included within the authenticated sensor data 1312, 1322. For example, in an embodiment, the third cryptographic coprocessor 1331 determines an expected MAC (or HMAC) based on the received data and corresponding session key. If the received MAC does not match the expected MAC, the authenticated sensor data 1312, 1322 is not validated and the computer processors 1330 do not continue processing the authenticated sensor data 1312, 1322.

In an embodiment, the authenticated sensor data 1312, 1322 is time stamped. In an embodiment, the third cryptographic coprocessor 1331 validates the authenticated sensor data 1312, 1322 based on a determining that the authenticated sensor data 1312, 1322 was received within an expected period of time. For example, in an embodiment, the third cryptographic coprocessor 1331 uses an expected time associated with the time it should take for the authenticated sensor data 1312, 1322 to transmit from the sensors 1310, 1320 to the computer processors 1330, and if the transmittal time is not within the expected period of time (e.g., time interval), the authenticated sensor data 1312, 1322 is not validated. In an embodiment, the third cryptographic coprocessor 1331 is configured to validate the authenticated sensor data 1312, 1322 by using an expected format. For example, if the received authenticated sensor data 1312, 1322 is not configured in an expected format (e.g., ASCII, LAS, CIFF, JPEG, RAW, etc.) the third cryptographic coprocessor 1331 does not validate the authenticated sensor data 1312, 1322. In an embodiment, if the received authenticated sensor data 1312, 1322 is not configured in an expected size (e.g., Mbs, Gbs, etc.) the third cryptographic coprocessor 1331 does not validate the authenticated sensor data 1312, 1322. Thus, the third cryptographic coprocessors 1331 can use several expected features of the authenticated sensor data 1312, 1322 to ensure that the authenticated sensor data 1312, 1322 is being received from the sensors 1310, 1320, and not an outside threat. In an embodiment, once the third cryptographic coprocessor 1331 validates the authenticated sensor data 1312, 1322, the computer processors 1330 parse the authenticated sensor data 1312, 1322 for further processing. In an embodiment, the computer processors 1330 parse the authenticated sensor data 1312, 1322 by organizing the sensor data in accordance with at least one parsing rule. For example, the computer processors 1330 organize the sensor data 1312, 1322 in accordance with sensor type, file type, file size, data type, object type, and so forth.

In an embodiment, the computer processors 1330 include a machine learning coprocessor configured to learn the ways in which the identification data of the authenticated sensor data 1312, 1322 is obfuscated. For example, in an embodiment, the machine learning coprocessors learn how the first and second cryptographic coprocessors 1311, 1321 algorithmically generate secondary values. In an embodiment, the machine learning coprocessors learn how the first and second cryptographic coprocessors 1311, 1321 algorithmically shuffle the values of the identification data. Thus, the computer processors 1330 can have one or more methods to ensure that the authenticated sensor data 1312, 1322 is being sent from the first and second sensors 1310, 1320. The machine learning coprocessor can include Bayesian model techniques and/or deep learning techniques. In an embodiment, the machine learning coprocessor is configured to learn the identification data associated with the first and second sensors 1310, 1320. For example, the machine learning coprocessor can learn waveform data associated with the sensors 1310, 1320, location data associated with the sensors 1310, 1320, and so forth.

Penetrative Testing on a Distributed Network

Figure 15:
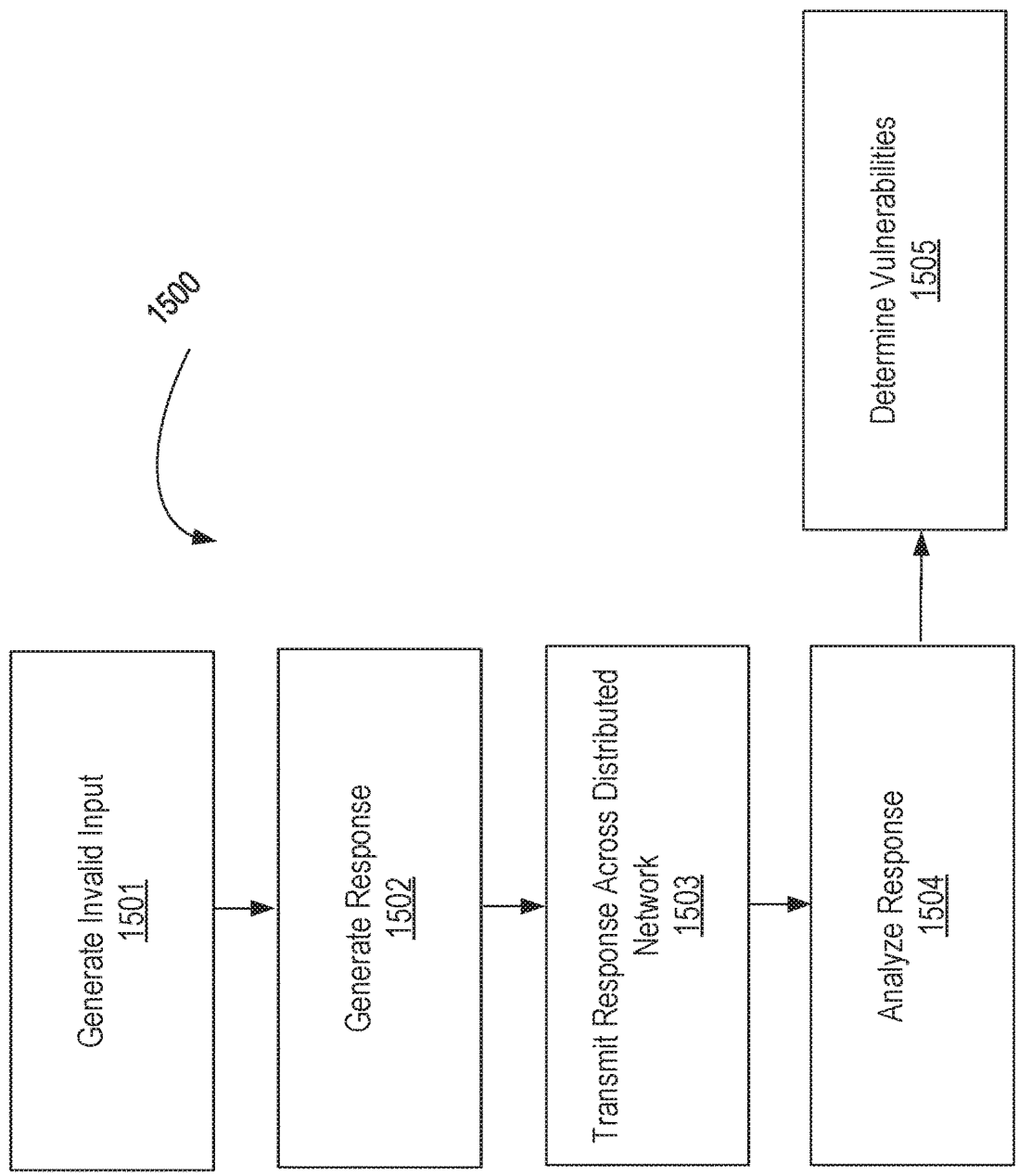
FIG. 15 shows a method for providing penetrative testing a distributed network, according to one or more embodiments of the present disclosure.

FIG. 15 shows a method 1500 for penetrative testing a distributed network, according to one or more embodiments of the present disclosure. In an embodiment, the method 1500 is used on a distributed network such as, for example, the AV system 120, the remote cloud servers 136, the cloud computing environment 200, and/or the remotely located database 124. The method includes generating invalid input (block 1501), generating a response (block 1502), transmitting response across a distributed network (block 1503), analyzing the response (block 1504), and determining vulnerabilities (block 1505).

At block 1501, a testing device generates a plurality of invalid inputs. The testing device is communicatively coupled to one or more components of the AV system 120. For example, in an embodiment, a testing device is communicatively coupled to one or more of the sensors 121. In an embodiment, a testing device is communicatively coupled to the computer processors 146. In an embodiment, the testing device is the computer processors 146 (e.g., the computer processors 146 have fuzz testing software installed thereon).

In an embodiment, the testing device is a fuzz tester. Hereinafter, the term 'fuzz testing' refers to providing invalid, unexpected, and/or random data as inputs to a computing program to determine the validity of output. In an embodiment, the fuzz tester is a black box, white box, and/or grey box fuzz tester. A black box fuzz tester refers to a fuzz tester that is unaware of a program's internal structure and thus generates inputs at random. A black box tester can be configured to learn the internal structure and behavior of a program during testing by observing the program's output in response to a given input. A white box fuzz tester refers to a fuzz tester that uses program analysis (e.g., symbolic execution, which is a means of analyzing a program to determine what inputs cause each part of a program to execute by assuming symbolic values for inputs) to glean information about the program's internal structure such that the tester is able to generate inputs that increase coverage and/or reach critical program locations. A grey box fuzz tester uses instrumentation (e.g., as opposed to program analysis) to glean information about the program's internal structure. Instrumentation refers to the ability to monitor or measure a program's performance to diagnose errors by, for example, using code instructions that monitor specific components in a system.

In an embodiment, the invalid inputs correspond to one or more of the sensors 121. For example, in an embodiment, the invalid input is a partially modified known good LiDAR input. The known good LiDAR input, which is a point cloud, can be modified, for example, by adding or removing one or more points, adding dummy points for features that do not correspond to detected features in the environment. In an embodiment, the invalid input is generated based on the protocol used by one or more of the sensors 121. In an embodiment, the invalid input is an invalid grammar input, invalid file format, and/or an invalid network protocol. In an embodiment, the invalid input is partially invalid, such that the input is not rejected by the sensors' 121 firmware. In an embodiment, the invalid input is partially valid input (e.g., with respect to one or more of the sensors 121) with one or more blocks of data removed and/or replaced with random blocks of data. In an embodiment, the testing device includes one or more sanitizers that crash the distributed network when a certain program failure is detected. For example, the sanitizers can crash the distributed network if a memory leak is detected. As another example, the sanitizers can crash the distributed network when a deadlock is detected. As another example, the sanitizers can crash the distributed network when a buffer overflow is detected.

At block 1502, the invalid input is transmitted to one or more of the sensors 121. The sensors 121 generate a response based on the invalid inputs. In an embodiment, the sensors 121 generate status data as a response to the invalid input. The generated status data can include one or more errors (e.g., wrong data format, wrong file type, etc.).

At block 1503, the response is transmitted across a distributed network. For example, in an embodiment, the response is distributed throughout the AV system 120. In an embodiment, the response is transmitted to the remotely located database 124. In an embodiment, the remotely located database 124 is a distributed computing database. In an embodiment, the response is transmitted to the cloud computing environment 200. In an embodiment, the response is transmitted to the communications devices 140, which can include Vehicle-to-Vehicle (V2V) and Vehicle-to-Infrastructure (V2I) communication devices and devices for wireless communications over point-to-point or ad hoc networks or both. Thus, in an embodiment, the response is transmitted across V2V communication links, V2I communication links, and/or vehicle-to-database communication links. In an embodiment, the response is transmitted to one of the sensors 121. In an embodiment, the response is transmitted to the computer processors 146.

At block 1504, output is generated according to the transmitted response at several locations of the distributed network. The testing device analyzes the response output at one or more locations of the distributed network. In an embodiment, the response output is analyzed at one or more of the sensors 121. In an embodiment, the response output is analyzed at the computer processors 146. In an embodiment, the response output is analyzed at the communication devices 140. In an embodiment, the distributed network comprises a plurality of terminal access points, and the response output is analyzed at one or more of the plurality of terminal access points. The response output can be a memory leak, a system crash, a deadlock, a race condition, a buffer overflow, failing built-in code assertions, a busy loop, other anomalous behavior, and so forth.

At block 1505, the testing device determines if one or more vulnerabilities exist within the distributed network based on the response output. For example, in an embodiment, if a memory leak is detected at a particular location of the distributed network (e.g., V2V communication links, the computer processors 146, terminal access points, remotely located database 124, cloud computing environment 200, etc.) the testing device determines that the particular location is vulnerable to a hacking attack (e.g., clickjacking). In an embodiment, if a crash is detected at a particular location of the distributed network, the testing device determines that the particular location is vulnerable to a hacking attack.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

Additional Embodiments

In some embodiments, a system includes one or more sensors. A portion of data associated with the one or more sensors has been digitally signed with a private key such that the portion of data is associated with a digital signature. At least one processor is configured to be communicatively coupled with the one or more sensors. The digital signatures of the respective portion of data are validated upon booting of each sensor of the one or more sensors. At least one session key is generated and encrypted. The at least one session key is sent to the one or more sensors after the one or more sensors have been booted. The at least one session key is decrypted. Sensor data is received from the one or more sensors. The sensor data includes a message authentication code generated using the at least one session key. The sensor data is validated at least partially based on the message authentication code and a determining that the sensor data was received within a pre-determined period of time. The validated sensor data is parsed.

In some embodiments, the at least one sensor includes at least one public key. The at least one public key is associated with one of the one or more sensors.

In some embodiments, the sensor data further includes identification data associated with the one or more sensors. The at least one processor includes a machine learning coprocessor configured to be communicatively coupled with the one or more sensors and further configured to learn secondary identification features of the one or more sensors.

In some embodiments, the at least one processor is further configured to validate the sensor data by determining whether the sensor data is configured in either an expected format, an expected size, or both.

In some embodiments, an at least partially invalid input is generated. The at least partially invalid input corresponds to at least one processor. The at least one processor generates a response based on the at least partially invalid input. The at least one processor transmits the response across a distributed network. The response output is analyzed at one or more locations of the distributed network. It is determined if one or more vulnerabilities exist within the distributed network based on the analyzing of the response output.

In some embodiments, the distributed network includes a vehicle-to-vehicle communication link.

In some embodiments, the distributed network includes a vehicle-to-infrastructure communication link.

In some embodiments, the distributed network includes a vehicle-to-database communication link.

In some embodiments, the distributed network includes at least one of: a distributed computing database and a cloud computing database.

In some embodiments, the distributed network includes one or more terminal access points and the analyzing of the response occurs at the one or more terminal access points.

In some embodiments, generating an at least partially invalid input includes generating a sanitizer configured to crash the at least one processor if a specific vulnerability associated with the sanitizer exists within the at least one processor.

What is claimed is:

1. A method comprising:
for each of one or more sensors of an autonomous vehicle, digitally signing, using a private key, a portion of data associated with a respective sensor of the one or more sensors of the autonomous vehicle such that the portion of data is associated with a digital signature;
validating, by at least one processor, the digital signatures of the respective portion of data upon booting of each sensor of the autonomous vehicle;
generating, by the at least one processor, at least one session key;
encrypting, by the at least one processor, the at least one session key;
sending, by the at least one processor, the at least one encrypted session key to the one or more sensors after booting of the one or more sensors of the autonomous vehicle, wherein each of the booted one or more sensors of the autonomous vehicle receives the at least one session key and decrypts at least one session key using the at least one processor;
sending, by the one or more sensors of the autonomous vehicle, sensor data to the at least one processor, the sensor data including a message authentication code generated using the at least one session key; and
validating, by the at least one processor, the sensor data at least partially based on the message authentication code and a determination that the sensor data was received within a pre-determined period of time, wherein the at least one processor parses the validated sensor data.

2. The method of claim 1, wherein digitally signing comprises storing at least one public key in the at least one processor, the at least one public key being associated with one of the one or more sensors of the autonomous vehicle.

3. The method of claim 1, wherein the sensor data includes identification data associated with the one or more sensors of the autonomous vehicle, the method further comprising anonymizing the identification data before sending the sensor data to the at least one processor.

4. The method of claim 3, wherein anonymizing the identification data comprises removing the identification data.

5. The method of claim 3, wherein the identification data comprises at least one of location data, waveform data, or tag identification data.

6. The method of claim 3, wherein anonymizing the identification data comprises obfuscating the identification data.

7. The method of claim 6, wherein obfuscating the identification data comprises at least one of: substituting the identification data values with secondary identification data values, encrypting the identification data, and shuffling the identification data.

8. The method of claim 6, wherein obfuscating the identification data comprises learning, by a machine learning coprocessor, secondary identification features associated with the identification data.

9. The method of claim 1, wherein validating the sensor data comprises determining whether the sensor data is configured in either an expected format, an expected size, or both.

10. The method of claim 1, wherein the sensor data includes movement of simulated objected.

11. The method of claim 1, wherein the message authentication code is a hash-based message authentication code.

12. The method of claim 1, wherein the at least one processor includes a controller circuit that generates the at least one session key.

13. The method of claim 1, wherein the at least one processor includes a non-migratable key configured for decrypting the encrypted session key.

14. The method of claim 1, wherein generating the at least one session key comprises generating at least one new session key each time the one or more sensors of the autonomous vehicle are booted.

15. The method of claim 1, wherein generating the at least one session key comprises generating at least one new session key after each new message is received from the one or more sensors of the autonomous vehicle.

16. The method of claim 1, wherein parsing the data comprises organizing the sensor data in accordance with at least one parsing rule.

17. The method of claim 1, wherein the portion of data includes computer executable code.

18. A system comprising:
one or more computer processors; and
a non-transitory computer-readable storage medium storing instructions, which when executed by the one or more computer processors cause the one or more computer processors to:
for each of one or more sensors of an autonomous vehicle, digitally sign, using a private key, a portion of data associated with a respective sensor of the one or more sensors of the autonomous vehicle such that the portion of data is associated with a digital signature;
validate the digital signatures of the respective portion of data upon booting of each sensor of the autonomous vehicle;
generate at least one session key;
encrypt the at least one session key;
send the at least one encrypted session key to the one or more sensors of the autonomous vehicle after booting of the one or more sensors of the autonomous vehicle, wherein each of the booted one or more sensors of the autonomous vehicle receives the at least one session key and decrypts at least one session key using the one or more computer processors;
send, by the one or more sensors of the autonomous vehicle, sensor data to the one or more computer processors, the sensor data including a message authentication code generated using the at least one session key; and
validate the sensor data at least partially based on the message authentication code and a determination that the sensor data was received within a pre-determined period of time, wherein the one or more computer processors parse the validated sensor data.

19. A non-transitory computer-readable storage medium storing instructions, which when executed by one or more computer processors cause the one or more computer processors to:
for each of one or more sensors of an autonomous vehicle, digitally sign, using a private key, a portion of data associated with a respective sensor of the one or more sensors of the autonomous vehicle such that the portion of data is associated with a digital signature;
validate the digital signatures of the respective portion of data upon booting of each sensor;
generate at least one session key;
encrypt the at least one session key;
send the at least one encrypted session key to the one or more sensors of the autonomous vehicle after booting of the one or more sensors of the autonomous vehicle, wherein each of the booted one or more sensors of the autonomous vehicle receives the at least one session key and decrypts at least one session key using the one or more computer processors;
send, by the one or more sensors of the autonomous vehicle, sensor data to the one or more computer processors, the sensor data including a message authentication code generated using the at least one session key; and
validate the sensor data at least partially based on the message authentication code and a determination that the sensor data was received within a pre-determined period of time, wherein the one or more computer processors parse the validated sensor data.

20. The non-transitory computer-readable storage medium of claim 19, wherein digitally signing comprises storing at least one public key in the one or more computer processors, the at least one public key being associated with one of the one or more sensors of the autonomous vehicle.

* * * * *